United States Patent
Miglioranza

(10) Patent No.: US 9,469,376 B2
(45) Date of Patent: Oct. 18, 2016

(54) ELECTRONIC BICYCLE SYSTEM

(71) Applicant: Campagnolo S.r.l., Vicenza (IT)

(72) Inventor: Federico Miglioranza, Schio (IT)

(73) Assignee: Campagnolo S.r.l., Vicenza (IT)

( * ) Notice: Subject to any disclaimer, the term of this patent is extended or adjusted under 35 U.S.C. 154(b) by 71 days.

(21) Appl. No.: 14/315,785

(22) Filed: Jun. 26, 2014

(65) Prior Publication Data

US 2015/0006043 A1    Jan. 1, 2015

(30) Foreign Application Priority Data

Jun. 26, 2013   (IT) .............................. MI2013A1064

(51) Int. Cl.
| | |
|---|---|
| *B62M 9/122* | (2010.01) |
| *B62M 9/132* | (2010.01) |
| *B62M 9/121* | (2010.01) |
| *B62M 9/131* | (2010.01) |
| *B62M 9/12* | (2006.01) |
| *B62M 25/08* | (2006.01) |
| *F16H 59/00* | (2006.01) |

(52) U.S. Cl.
CPC .............. *B62M 9/122* (2013.01); *B62M 9/132* (2013.01); *B62M 25/08* (2013.01); *F16H 59/00* (2013.01)

(58) Field of Classification Search
CPC .... B62M 9/122; B62M 9/132; B62M 25/08; B62M 9/12; B62M 9/121; B62M 9/131
See application file for complete search history.

(56) References Cited

U.S. PATENT DOCUMENTS

| | | | |
|---|---|---|---|
| 5,059,158 A * | 10/1991 | Bellio | B62M 9/12 474/103 |
| 5,357,177 A | 10/1994 | Fey et al. | |
| 6,988,739 B2 * | 1/2006 | Guderzo | B62M 25/08 280/259 |
| 9,008,923 B2 * | 4/2015 | Takamoto | B62M 25/00 474/116 |
| 2006/0058134 A1 * | 3/2006 | Mercat | B62M 25/08 474/80 |

FOREIGN PATENT DOCUMENTS

| | | |
|---|---|---|
| DE | 202013100453 U1 | 2/2013 |
| EP | 1279929 A2 | 1/2003 |

OTHER PUBLICATIONS

Italian Search Report and Written Opinion in Italian Application No. IT MI2013A001064, Mar. 11, 2014 with English translation.

* cited by examiner

*Primary Examiner* — Jacob S Scott
*Assistant Examiner* — Tinh Dang
(74) *Attorney, Agent, or Firm* — Volpe and Koenig, P.C.

(57) ABSTRACT

An electronically servo-assisted bicycle gearshift is disclosed, comprising a derailleur and control electronics to drive the derailleur in accordance with a table of command values, wherein the derailleur is configured to emit a derailleur model identification signal, and the control electronics is configured to receive the derailleur model identification signal and, if it has an available table of command values suitable for the derailleur model, to use it to drive the derailleur, if not, to prevent the actuation of the derailleur.

15 Claims, 7 Drawing Sheets

ELECTRONIC BICYCLE SYSTEM

CROSS REFERENCE TO RELATED APPLICATION(S)

Figure 1:
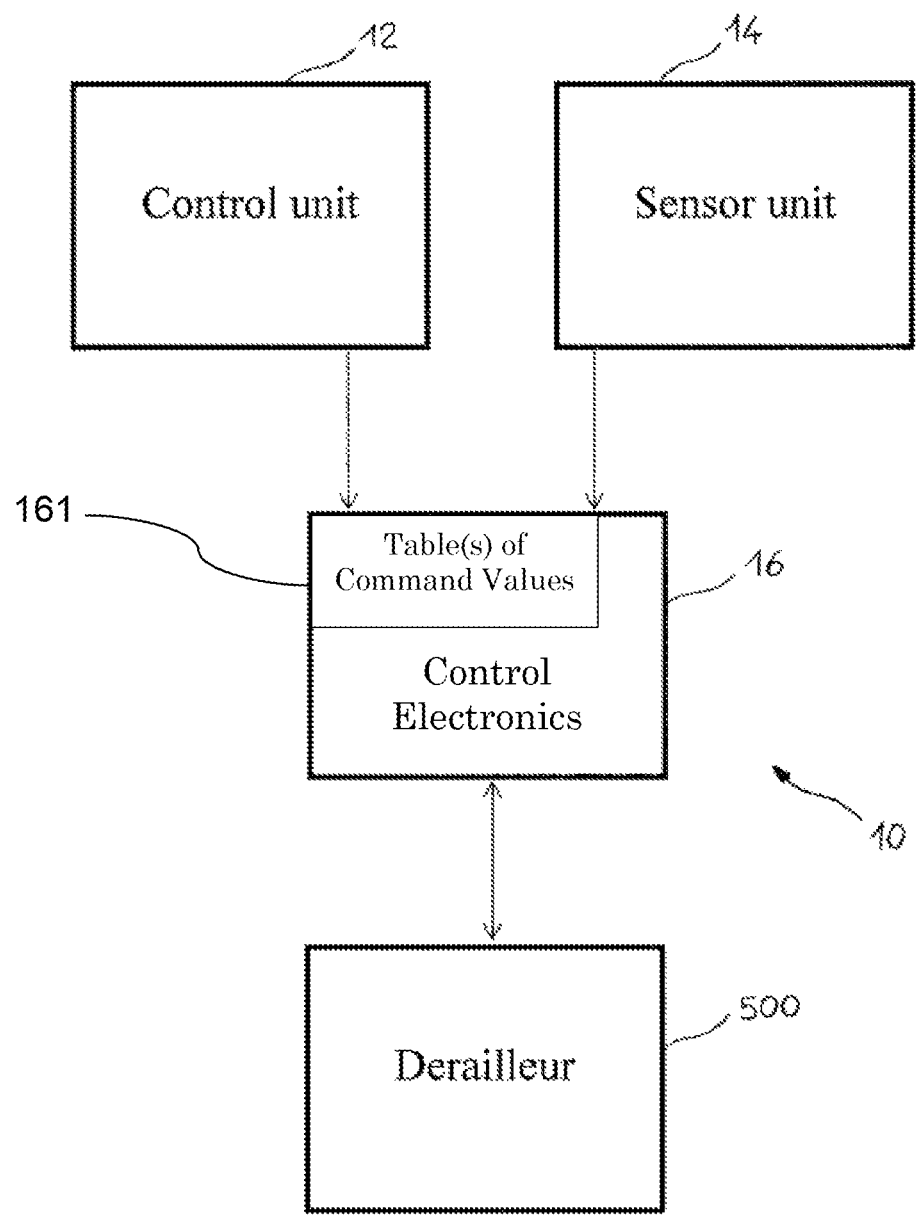

This application claims the benefit of Italian Application No. MI2013A001064, which was filed on Jun. 26, 2013, and is incorporated herein by reference as if fully set forth.

FIELD OF INVENTION

The present invention relates to an electronic bicycle system, and in particular an electronic bicycle gearshift.

BACKGROUND

A motion transmission system in a bicycle comprises a chain extending between toothed wheels associated with the axle of the pedal cranks and with the hub of the rear wheel. When there is more than one toothed wheel at at least one of the axle of the pedal cranks and the hub of the rear wheel, and the motion transmission system is therefore provided with a gearshift, a front derailleur and/or a rear derailleur are provided for. In the case of an electronically servo-assisted gearshift, each derailleur comprises a chain guide element, also known as cage, movable to move the chain among the toothed wheels in order to change the gear ratio, and an electromechanical actuator to move the chain guide element. The actuator in turn typically comprises a motor, typically an electric motor, coupled with the chain guide element through a linkage such as an articulated parallelogram, a rack system or a worm screw system, as well as a sensor or transducer of the position, speed, acceleration and/or direction of rotation, of the rotor or of any moving part downstream of the rotor, down to the chain guide element itself. It is worthwhile noting that slightly different terminology from that used in this context is also in use.

Control electronics changes the gear ratio automatically, for example based on one or more detected variables, such as the travel speed, the cadence of rotation of the pedal cranks, the torque applied to the pedal cranks, the slope of the travel terrain, the heart rate of the cyclist and similar, and/or the gear ratio is changed based on commands manually input by the cyclist through suitable control members, for example levers and/or buttons.

A device or unit for controlling the front derailleur and a device or unit for controlling the rear derailleur—or just one of the two in the case of simpler gearshifts—are so mounted as to be easy for the cyclist to manoeuvre, normally on the handlebars, close to the handgrips thereof where the brake lever for controlling the front and rear wheel brake, respectively, is also located. Control devices that make it possible to drive both a derailleur in the two directions and a brake are commonly called integrated controls.

By convention, the device for controlling the front derailleur and the brake lever of the front wheel are located close to the left handgrip, and vice-versa the device for controlling the rear derailleur and the brake lever of the rear wheel are located close to the right handgrip.

EP 1 279 929 A2 discloses a transducer of angular quantities for a bicycle comprising a first and a second part which can perform a relative movement of rotation about a given axis, a magnetized element integrally fixed to one of said first and second part, and at least one pair of Hall effect sensors set angularly staggered with respect to one another about said given axis and integrally fixed to the other of said first and second part; said Hall effect sensors being sensitive to the presence of said magnetized element so as to generate respective output signals with values varying in a continuous range, the values of said respective output signals uniquely identifying the relative position of said first and second part with respect to said given axis. The values of the output signals also uniquely identify the direction of rotation of the first and of the second part with respect to the axis and the angular speed of rotation and/or acceleration. The transducer can be integrated in a motor/actuator, such as for example the motor/actuator of a motor-driven gearshift mounted on a cycle such as a competition bicycle.

Indeed, it is in general known to drive the derailleur of a bicycle gearshift with reference to values of a table of command values, each correlated to a position of the derailleur in which there is or takes place engagement of the chain with a specific toothed wheel. In order to drive the actuator, the control electronics uses a table of values containing, for each toothed wheel, the value that a variable of the derailleur must take up to position the chain in engagement with the toothed wheel. Such a value can be a differential value with respect to the adjacent toothed wheel, or it can be an absolute value with respect to a reference, for example with respect to a reference toothed wheel or to an end of stroke condition or a condition of lack of excitation of the motor.

From the point of view of magnitude, a command value of the actuator of the table of values can for example be the distance travelled by a mobile point taken as reference on the derailleur, the number of steps or revolutions that the motor should be made to perform, a length of excitation time of the motor, the value of a power supply voltage of a motor having an excursion proportional to the voltage, or furthermore it can be the value emitted by the sensor or transducer associated with the motor, a numerical value stored in a register and representative of one of the aforementioned amounts, etc.

In particular, the motors of the actuators can be driven for a number of steps or for a length of excitation time or with a voltage that are appropriate for each upward or downward gearshifting and then automatically stopped, while the sensors are used to provide a feedback signal to the control electronics so that it can possibly take care of actuating the actuator motors again in case the intended position has not been reached, namely the aforementioned variable of the derailleur, has not taken up the table value. This may for example be due to the fact that the resistant torque offered by the derailleur which to a certain extent depends on how the cyclist is pedalling, was too high, greater than the maximum torque that can be delivered by the motors through the linkage.

The values of said table of command values are nominal values, set in the factory, which take the number of toothed wheels in the derailleur (front or rear) and the respective thicknesses and distances between centres into account. Typically, such nominal values provide that, in the absence of the driving signal of the actuator, namely with command value at zero, the chain is in engagement with the toothed wheel having the smallest diameter, although as can be seen from the aforementioned examples, this condition is not necessary.

The table of values must accurately correspond to the electromechanical components of the gearshift, in particular to the distances between centres of the toothed wheels and/or to the mutual position of the elements of the motor or of the linkage taken as fixed reference and as mobile reference, as well as possibly to the progression of the actuation voltage of the motor, to the speed, acceleration and/or direction of rotation of the motor, etc.

Moreover, it is not unusual for the replacement of a derailleur to take place with a different model of derailleur, thus having different command values. The Applicant has realised that the actuation of a derailleur by reference to unsuitable command values can lead not only to temporary failure with possible worsening of performance, but also damage to the mechanics.

The problem at the basis of the invention is to provide an electronic bicycle system suitable for overcoming the aforementioned drawbacks.

SUMMARY OF THE INVENTION

Such a problem is solved by an electronic bicycle system capable of checking whether the derailleur is of a known model, and in the affirmative case driving it in a suitable manner, preventing it from operating in the negative case.

In an aspect thereof, the present invention relates to an electronically servo-assisted bicycle gearshift, comprising a derailleur and control electronics to drive the derailleur in accordance with a table of command values, characterised in that the derailleur is configured to emit a derailleur model identification signal, and the control electronics is configured to receive the derailleur model identification signal and, if it has an available table of command values suitable for the derailleur model, to use it to drive the derailleur, if not, to prevent the actuation of the derailleur.

The derailleur model identification signal can also be indicated as recognition signal.

This embodiment of the electronic bicycle system or gearshift can be further improved through the following additional features that can be combined together as wished.

Typically, the gearshift comprises a chain and toothed wheels system for the transmission of motion from the axle of the pedal cranks to a driving wheel of the bicycle, said motion transmission system comprising at least two toothed wheels that are coaxial along an axis selected from the axle of the pedal cranks and the axis of the driving wheel, and the derailleur comprises a chain guide element and an actuator of the chain guide element to move the motion transmission chain in engagement with a preselected toothed wheel of said at least two coaxial toothed wheels.

Preferably, the derailleur is configured to emit the model identification signal and a signal functional for evaluating the position, speed, acceleration and/or direction of rotation of the derailleur on a common output.

More preferably, the derailleur is configured to emit the model identification signal on the common output for a first predetermined time period.

Preferably, the derailleur is configured to emit the model identification signal, preferably on the common output for the first predetermined time period, on at least one occasion among: when the electronic bicycle gearshift is turned on, upon each gearshifting request, upon request from an operator; more preferably, when the electronic bicycle gearshift is turned on and upon each gearshifting request.

Providing to identify the derailleur model upon each gearshifting request increases the safety of the system, because the derailleur could be replaced without turning the system off and on again.

Preferably, the control electronics is configured to check, upon each gearshifting request and based on the model identification signal, whether the derailleur has changed and, in the affirmative case, to prevent the actuation of the derailleur.

Preferably, the control electronics is configured to wait a second predetermined time period corresponding to an initial part of the first predetermined time period before checking the model identification signal.

Said wait for the second predetermined time period advantageously allows the model identification signal to be stabilized.

Preferably, the control electronics is configured to wait a third predetermined time period corresponding to a final part of the first predetermined time period and to a subsequent time period before checking the signal functional for evaluating the position, speed, acceleration and/or direction of rotation of the derailleur.

Said wait for the third predetermined time period advantageously allows the signal functional for evaluating the position, speed, acceleration and/or direction of rotation of the derailleur to be stabilized.

Preferably, the derailleur comprises a voltage reference generator, preferably comprising a buffer and a resistive divider, configured to generate, as said model identification signal, a constant voltage signal.

Preferably, the control electronics is configured to check in which of a plurality of ranges of predetermined values the constant voltage signal falls and thus discriminate the derailleur model.

Preferably, the derailleur further comprises a timer to count said first predetermined time period.

Preferably, the derailleur further comprises a switch, preferably analogue, to switch an output of the derailleur between said model identification signal and said signal functional for evaluating the position, speed, acceleration and/or direction of rotation of the derailleur.

Preferably, the control electronics is further configured to check whether the signal functional for evaluating the position, speed, acceleration and/or direction of rotation of the derailleur is comprised within a predetermined range of values, and in the negative case to prevent the actuation of the derailleur.

In another aspect the invention relates to a bicycle derailleur configured to emit a unique model identification signal.

In another aspect the invention relates to a component of an electronic bicycle gearshift comprising control electronics to drive a derailleur in accordance with a table of command values, characterised in that the control electronics is configured to receive a derailleur model identification signal and, if it is in possession of a table of command values suitable for the derailleur model, to use it to drive the derailleur, if not, to prevent the actuation of the derailleur.

In another aspect, the present invention relates to a method for actuating an electronically servo-assisted bicycle gearshift, the gearshift comprising a derailleur and control electronics to drive the derailleur in accordance with a table of command values, characterised in that it comprises the steps of:

emitting a derailleur model identification signal from the derailleur, receiving the derailleur model identification signal in the control electronics, checking in the control electronics whether there is an available table of command values suitable for the derailleur model, and in the affirmative case using it to drive the derailleur, in the negative case preventing the actuation of the derailleur.

BRIEF DESCRIPTION OF THE DRAWING(S)

Figure 4:
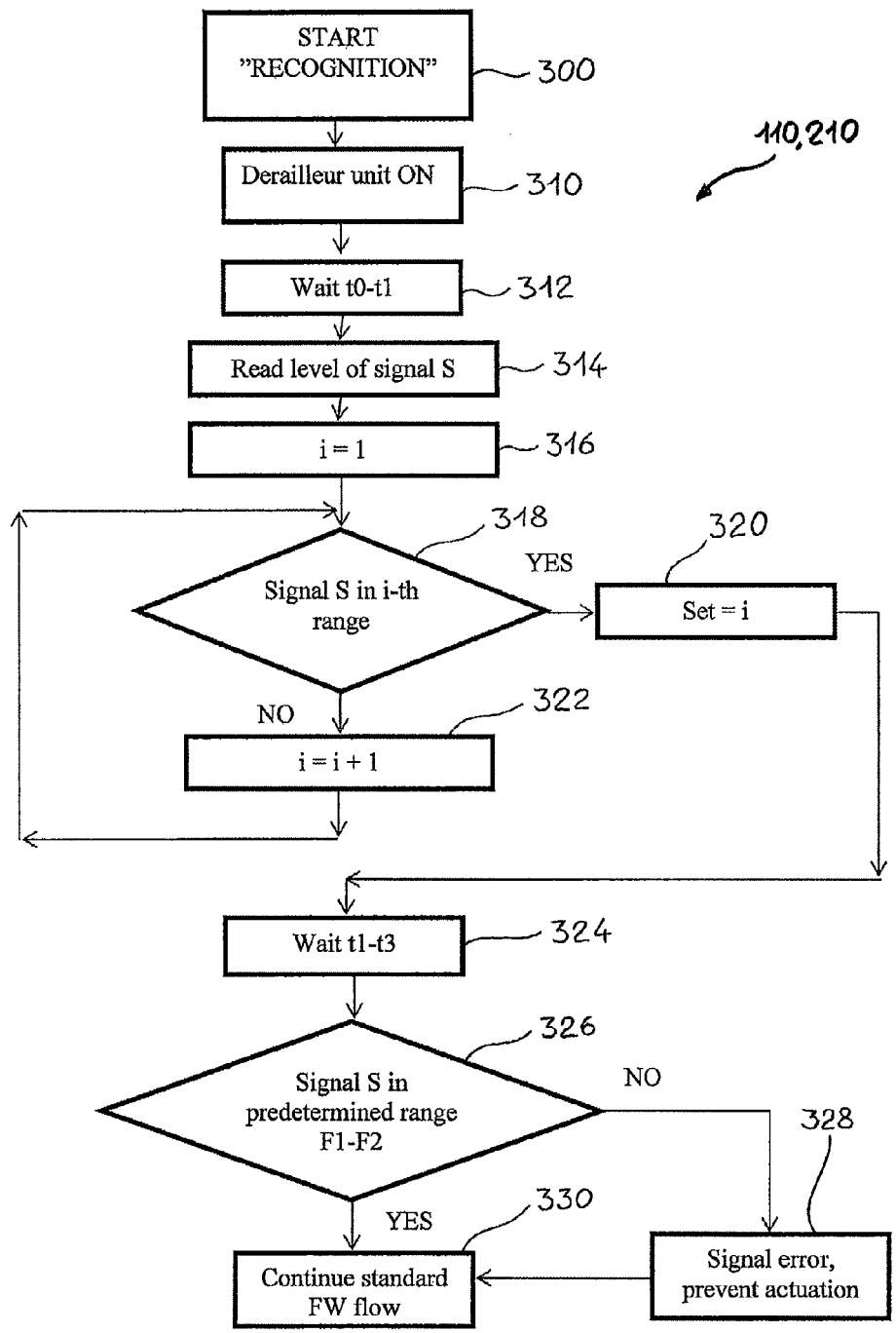
Figure 5:
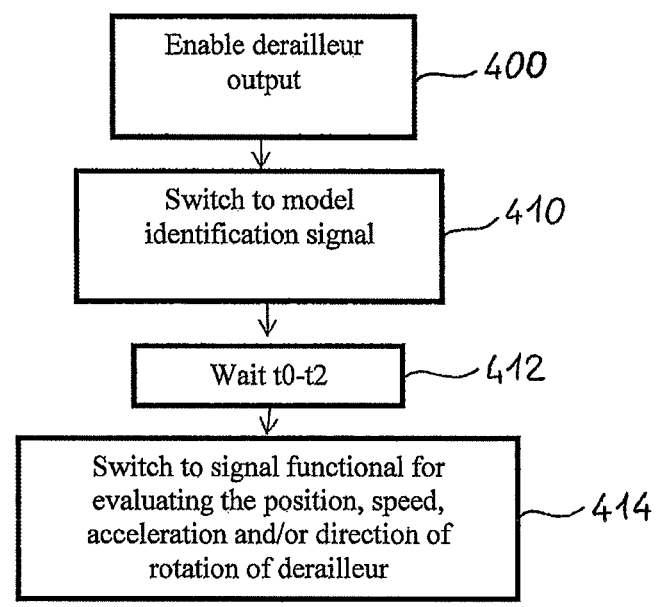
Figure 6:
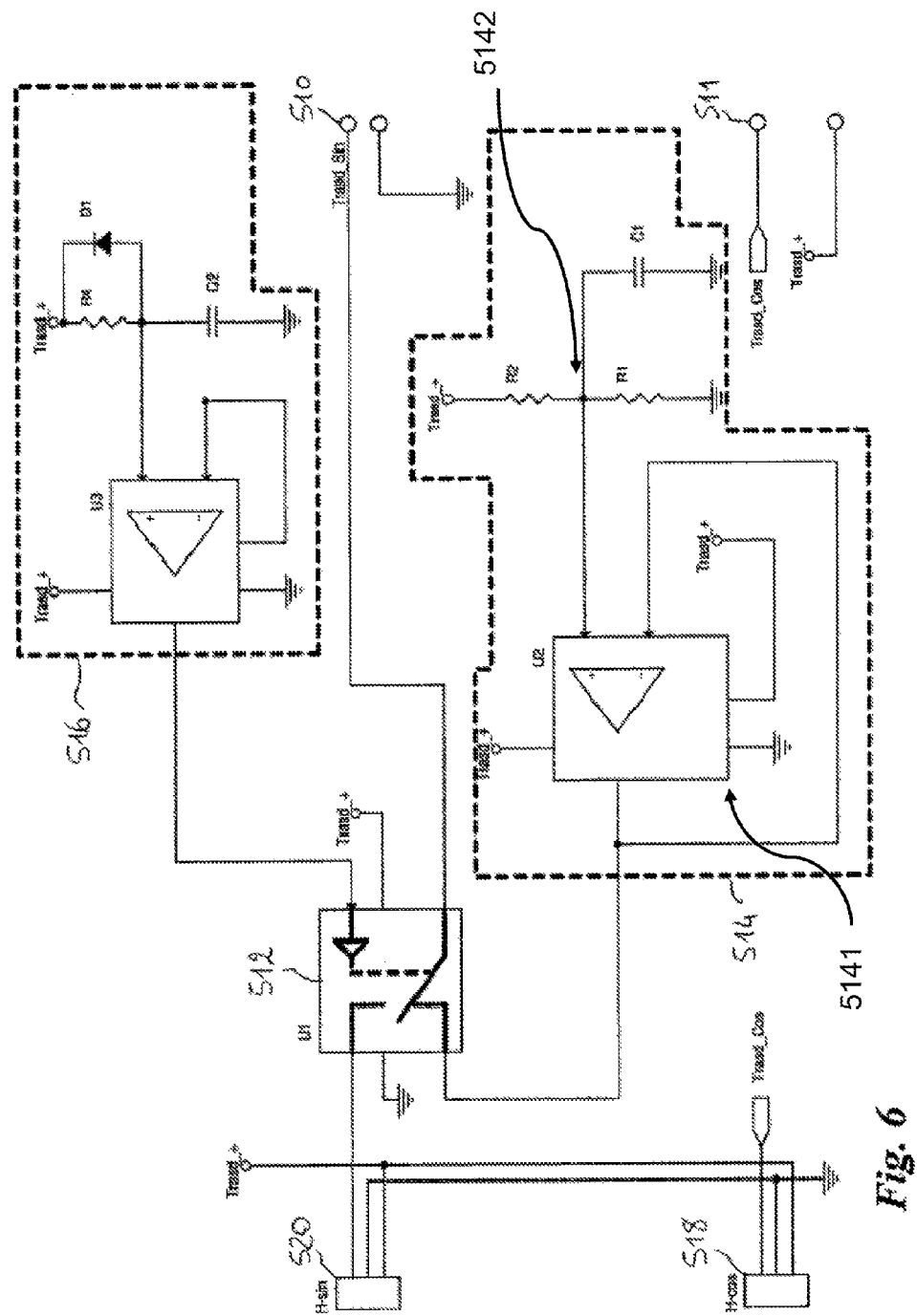
Figure 7:
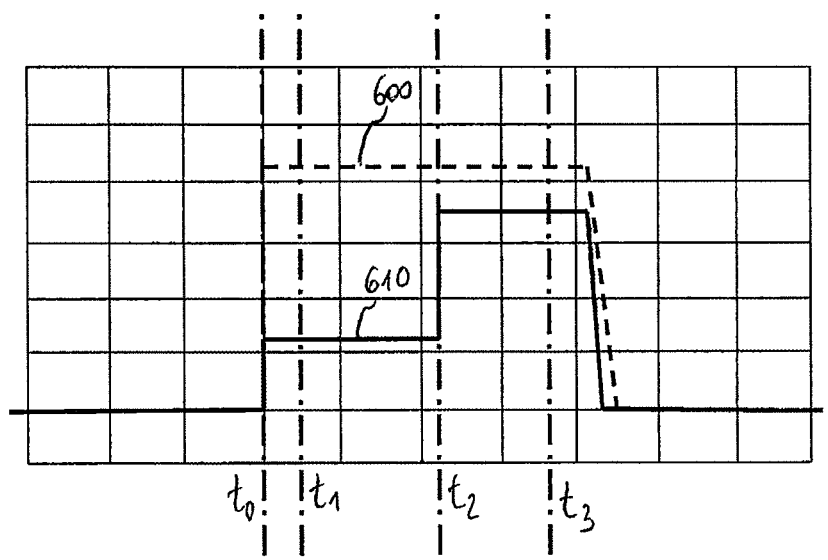
Figure 8:
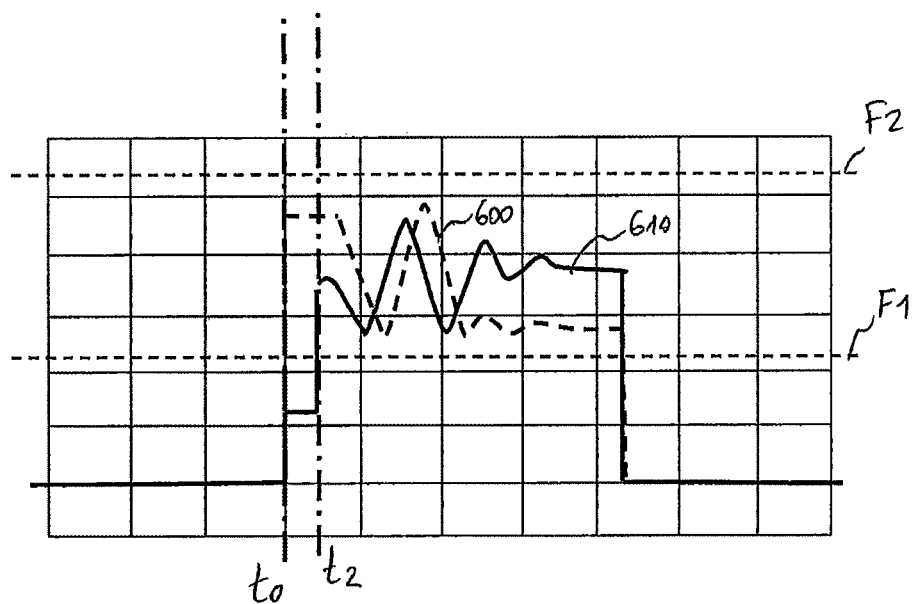

Further features and advantages of the present invention will become clearer from the following detailed description of an embodiment thereof, made with reference to the attached drawings. In such drawings:

FIG. 1 is a block diagram of an embodiment of an electronic bicycle system according to the invention, FIGS. 2-5 are block diagrams relative to the operation of the electronic bicycle system according to the invention, FIG. 6 is a circuit diagram of a derailleur unit of the electronic bicycle system according to the invention, and FIGS. 7-8 are schematic diagrams illustrating the progression of output signals of the derailleur unit of FIG. 6.

DETAILED DESCRIPTION OF THE PREFERRED EMBODIMENT(S)

FIG. 1 is a block diagram of an embodiment of an electronic bicycle system or gearshift 10 according to the invention. The gearshift 10 shown comprises: a control unit or device 12 to manually input gearshifting request signals; a sensor unit 14 configured to detect one or more variables such as the travel speed, the cadence of rotation of the pedal cranks, the torque applied to the pedal cranks, the slope of the travel terrain, the heart rate of the cyclist and the like; control electronics 16 configured to establish the desired gear ratio automatically based on the signals emitted by the sensor unit 14 and/or based on commands emitted by the control unit 12; and a derailleur 500 to actuate gearshifting, controlled by the control electronics 16. The derailleur 500 in turn provides indications to the control electronics 16, as will be made clear hereinafter.

In other embodiments of the gearshift 10, there can be two control units 12 or none (in the case of a completely automatic gearshift) or vice-versa the sensor unit 14 can be absent (in the case of a completely manual gearshift).

The control electronics 16 of the derailleur 500 is shown in FIG. 1 as a separate component from the control unit 12 and from the sensor unit 14, but it can be part of one of the two. Moreover, the control electronics 16 of the derailleur 500 can be part of a power unit that generates a voltage of suitable value to drive the motor of the derailleur.

Further details and generalizations relating to the general structure of the bicycle gearshift are provided in the introductory part of the present disclosure.

Figure 2:
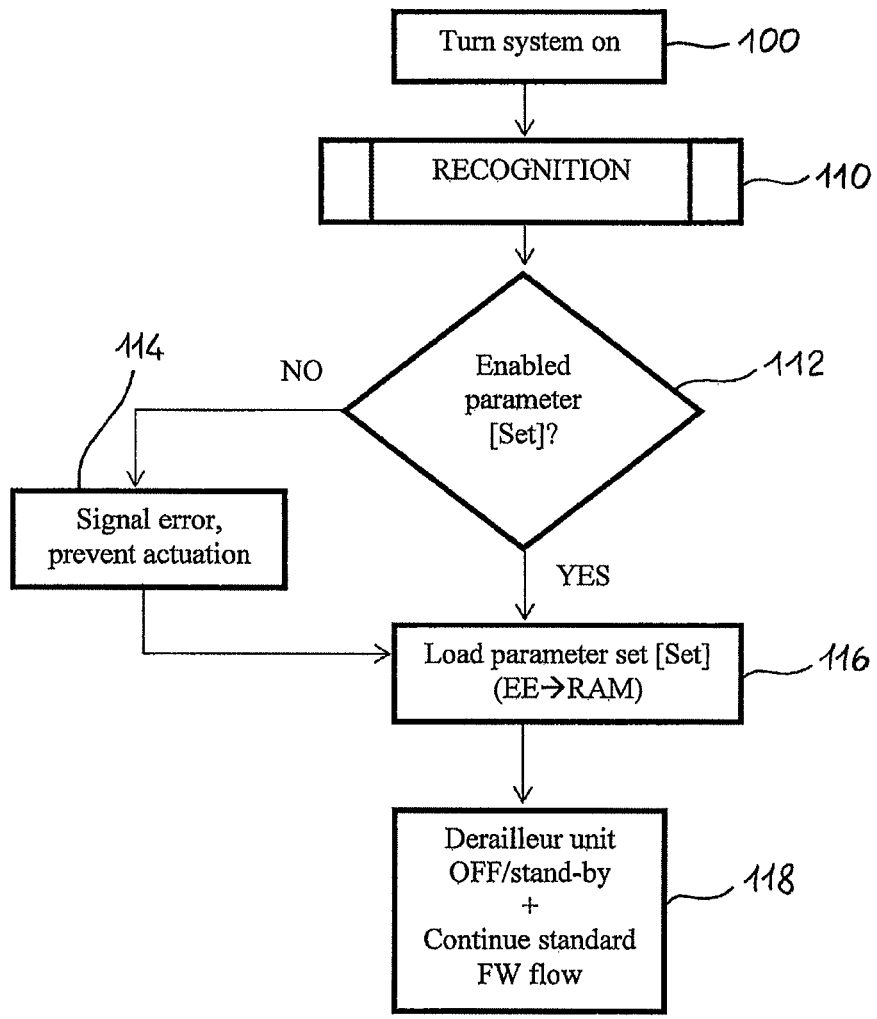

FIG. 2 illustrates a block diagram relating to the operation of the electronic bicycle system 10 at the moment when it is turned on. In a block 100 the system is turned on. In a subsequent block 110 there is a recognition step of the derailleur model mounted in the electronic bicycle system 10, better illustrated with reference to FIG. 4. The recognition step or routine 110 outputs a value of a variable indicated with Set in FIG. 2 and in FIGS. 3 and 4. In a subsequent block 112 the system checks whether it has available a set of parameters—or table of command values 161 (shown in FIG. 1)—correlated to the value of the variable Set returned by the recognition routine 110, and whether such a set of parameters is enabled, as indicated by a respective flag. In the negative case, in a block 114 the system preferably signals the error—for example by setting an error flag to true in the memory, which in particular can cause an LED to be turned on and/or an acoustic signal to be emitted in another part of the system 10. In block 114 the actuation of gearshifting is in any case prevented, in particular a prevention flag in the memory is set to true.

Both in the case in which the check of block 112 gives a positive outcome and after block 114 has been carried out, in a block 116 the electronic bicycle system takes care of loading the set of parameters corresponding to the current value of the variable Set, in particular making a copy from an erasable electronic memory EEPROM to a random access memory RAM for subsequent use for driving the derailleur. By also loading a non-enabled set of command values it is prevented there being non-initialised variables, which could be the source of runtime errors. The execution of block 116 could in any case be left out in the case of a negative check in block 112.

In the case of the embodiment described herein, wherein the output of a derailleur unit 500 (see for example FIG. 6) is used to recognise the derailleur, in a subsequent block 118 the derailleur unit 500 is turned off or put in stand-by, and in any case the standard firmware flow is continued to be carried out. Such a standard firmware flow comprises for example the monitoring of the switches manually actuated for sending the gearshifting commands in the control unit 12, the monitoring of the outputs of the various sensors of the sensor unit 14 and their processing in the control electronics 16 to check whether the gear ratio should be changed, etc.

Figure 3:
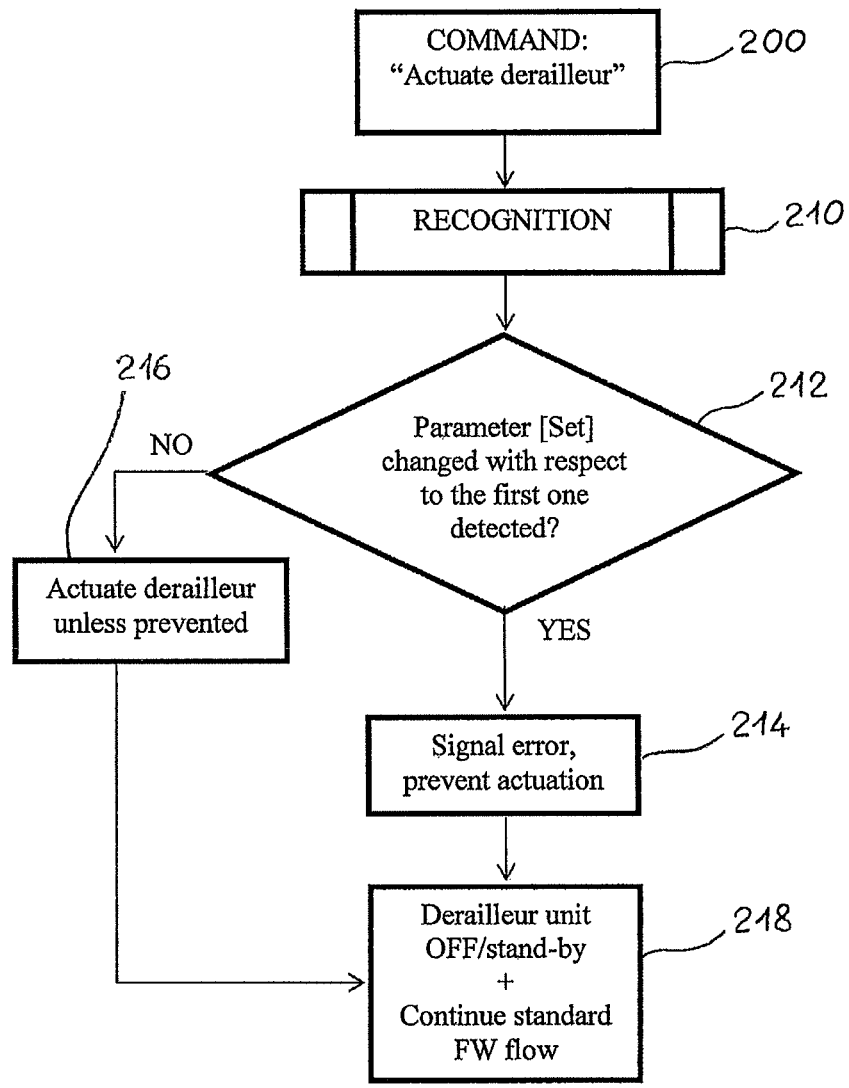

With reference to FIG. 3, the operation of the electronic bicycle system 10 for actuating a gearshifting command, namely for actuating the derailleur 500, is described. In a block 200 the electronic bicycle system 10 and in particular the control electronics 16 receives from the control unit 12, or automatically generates based on the variables detected by the sensor unit 14, a command requesting the actuation of the derailleur 500. In a subsequent block 210 the system carries out the recognition routine described hereinafter with reference to FIG. 4. In a subsequent block 212 the system checks whether the value of the variable Set returned by the recognition routine 210, and therefore the related set of parameters or table of command values, has changed with respect to that which was detected when it was turned on according to the block diagram of FIG. 2. In the affirmative case, in a block 214 the system proceeds, similarly to block 114 of FIG. 2, to preferably signal the error and in any case to prevent the actuation of the derailleur 500, in particular to set the related error and prevention flags to true, which are managed elsewhere in the system 10.

On the other hand, in case the check of block 212 is negative and therefore the set of parameters or value of the variable Set returned by the recognition routine 210 has not changed with respect to the first one detected when it was turned on, in a block 216 the electronic bicycle system 10 actuates the derailleur 500—unless it has been prevented in block 114 of FIG. 2 or in block 214 of FIG. 3, as indicated by the value of the prevention flag. In a block 218, reached both after carrying out block 214 and after carrying out block 216, the derailleur unit 500 is turned off or put in stand-by, and the standard firmware flow continues.

Before proceeding to the description of an embodiment of the recognition routine of the block 110 of FIG. 2 and of the block 210 of FIG. 3, it is worthwhile emphasising the advantages of carrying out block 112 of checking whether a set of parameters is enabled. According to a preferred embodiment of the invention, indeed, each set of parameters or table of command values is also provided with a flag that indicates whether the set of parameters is suitable for the type of derailleur recognised. This check indeed allows an electronic bicycle system 10 to be provided that is able to discriminate for example among four types or models of derailleur, even having the sets of parameters enabled just for some of these types or models of derailleur. For example, this opportunity can be exploited by loading into each electronic bicycle system sets of parameters enabled for all pre-existing and current types of derailleur of a certain factory, but also enabling the recognition of models that are foreseen to be made later. The advantage is the fact that the part of electronic bicycle system intended for recognising the derailleur does not need to be redesigned for future systems, which will simply each have an increasing number of sets of parameters enabled. The sets of parameters in the control electronics 16 can also be updated with an upgrade when new models of derailleur become available.

With reference to FIG. 4, the recognition routine of block 110 of FIG. 2 and of block 210 of FIG. 3, which starts in a block 300, will now be described. In a block 310 the output 10 of the derailleur unit 500 is enabled, at a moment indicated hereinafter with t0. In a block 312 a first time period from t0 to t1 is preferably waited. This time period, for example of 5 ms, is to stabilize the output signal of the derailleur unit 500. In a subsequent block 314 the electronic bicycle system reads the level of signal S of the output of the derailleur unit 500. As can be seen with reference to FIG. 5 described hereinafter, at this moment the signal S of the output of the derailleur unit 500 is a constant model identification signal, identifying the derailleur model.

In a subsequent cycle 316-322 it is checked in what range of values the signal S that is received and read in block 314 is located. In greater detail, in a block 316 the value of a counter "i" is initialised to 1. In a block 318 it is checked whether the signal level is within an i-th range of values. In the affirmative case, in a block 320 the value of the variable Set is set at the current value of the counter "i". In the negative case, in a block 322 the counter "i" is increased and the execution of block 318 is returned to. In an alternative embodiment, instead of as cycle 316-322, this setting of the variable Set can be carried out as a series of successive checks, each relative to a specific range of values.

The ranges of values are preferably selected so that the electronic bicycle system always gives as the result a value of the variable Set, for a value of the counter "i" that is variable between 1 and a predetermined maximum value. Just as an example, in block 314 it is possible to evaluate a constant voltage signal and discriminate among four types or models of derailleur as follows:

signal comprised between 0.1 and 0.4 Volt: Set=1
signal comprised between 0.5 and 0.8 Volt: Set=2
signal comprised between 1.0 and 2.3 Volt: Set=3
signal comprised between 2.5 and 2.7 Volt: Set=4

The advantage of using not adjacent ranges of values consists in that it eliminates the cases of uncertainty between two sets. A voltage signal not comprised in any of the aforementioned ranges will be an indication of a failure or it corresponds to a derailleur for example of another factory; in any case, it does not have any valid set of parameters associated therewith. It is also possible to provide for a check whether the counter "i" has exceeded the predetermined maximum value and, in this case, preferably an error signal and the prevention of the actuation of the derailleur (blocks not shown for the sake of simplicity).

Once the value of the variable Set has been set at the current value of the counter "i" in block 320, the execution continues with a block 324. In block 324 a second wait is carried out, from moment t1 (neglecting the duration of the execution of blocks 314-322) to a moment t3. This wait, as will become clearer hereinafter with reference to FIG. 5, is to reach the condition in which the derailleur unit 500 has switched the output between the derailleur model identification signal and a signal functional for evaluating the position, speed, acceleration and/or direction of rotation of the derailleur—said switching taking place at a moment t2 intervening between moments t1 and t3—as well as to wait for the functional signal to settle. Turning back to FIG. 4, after the second wait of block 324, a block 326 of checking whether the level of the functional signal is comprised within a predetermined range between threshold values F1 and F2 is preferably carried out.

In the negative case, in a block 328 the error condition is preferably signalled, and the actuation of the derailleur 500 is in any case prevented, similarly to block 114 of FIG. 2, therefore preferably by setting to true respective flags managed elsewhere by the electronic bicycle system 10. After block 328 or in the case of a positive outcome of the check of block 326, in a block 330 the electronic bicycle system 10 continues with the standard firmware flow. The check of block 326 allows failures of the sensors of the position, speed, acceleration and/or direction of rotation of the derailleur that emit the aforementioned functional signal to be identified.

FIG. 5 illustrates a block diagram relative to the enabling of the output of the derailleur unit 500, as occurs at block 310 of FIG. 4. FIG. 6 illustrates the circuit diagram of a derailleur unit 500. With reference to such figures, in a block 400 the derailleur unit 500 receives the enabling request. In a block 410 the derailleur unit 500 switches an output 510 thereof, through a switching block 512 or multiplexer or switch that is preferably analogue, to a constant voltage value. This constant voltage value is generated by a voltage reference generator 514. In the embodiment shown, this comprises a buffer 5141 and a resistive divider 5142 (both shown in FIG. 6), but different embodiments are possible, for example with a specific integrated circuit.

In a subsequent block 412 a time period from t0 to t2 is waited, with t2>t1 according to block 312. This wait is carried out through a timer 516, which in the embodiment shown comprises a threshold comparator. After this wait, in a block 414 the switch 512 switches the output 510 of the derailleur unit 500 onto the sensor of the position, speed, acceleration and/or direction of rotation of the derailleur.

FIG. 7 schematically illustrates the progression of the output signal of the derailleur unit 500 in the case of the derailleur unit 500 being turned on and of recognition of the model without any actuation of the derailleur. Before the moment indicated with t0 the derailleur unit 500 is turned off. At moment t0, the derailleur unit 500 is turned on. A first Hall sensor 518 facing a magnet rotating with the drive shaft of the derailleur generates at an output 511 of the derailleur unit 500 a signal that can be used immediately, indicated as signal 600 with a broken line in FIG. 7. The electronic bicycle system 10 and in particular the derailleur unit 500 of FIG. 6 comprises a second Hall sensor 520 facing the same rotating magnet, but in a position offset by 90 degrees with respect to the first Hall sensor 518. In the time period comprised between moments t0 and t2, however, the output of the second Hall sensor 520 is replaced, through the timer 516 and the switch 512, with the output at constant voltage generated by the voltage reference generator 514, which unequivocally identifies the model of the derailleur unit 500 as stated above. FIG. 7 indicates, as signal 610 with a solid line, the value of the output 510 of the derailleur unit 500, corresponding to the constant signal emitted by the voltage reference generator 514 between moments t0 and t2.

At moment t2 the switch 512 switches the output 510 of the derailleur unit 500 onto the output of the second Hall sensor 520, see again the signal 610 with a solid line in FIG. 7. After moment t3, the output of the derailleur unit 500 is turned off and both of the signals 600, 610 at the outputs 510 and 511 of the derailleur unit 500 go back to a zero value.

FIG. 7 also illustrates moment t1 defining the waiting time between t0 and t1 of block 312 of FIG. 4, in which it is waited for the constant model identification signal emitted by the voltage reference generator 514 to stabilize, and moment t3 corresponding to the end of the wait for the output signal of the second Hall sensor 520 to stabilize, block 324 of FIG. 4.

FIG. 8 illustrates the progression of the output signal of the derailleur unit 500 in the case of actuation of the derailleur to carry out gearshifting. It is recognised that the output of the first Hall sensor 518, of cosinusoidal progression, is immediately available after moment t0 of turning on the derailleur unit 500 in block 310 of FIG. 4, while only after moment t2, namely after the wait of block 412 of FIG. 5, the output of the second Hall sensor 520, of sinusoidal progression, is available. Before moment t2, the constant derailleur model identification signal, generated by the voltage reference generator 514, is available.

Two threshold values F1, F2 defining the predetermined range of values evaluated in block 326 of FIG. 4 are also illustrated.

The switching of the output 510 of the derailleur unit 500 between the model identification signal and the signal of the Hall sensor 520 is advantageous since it allows the number of connectors in the system 10 to be reduced. Moreover, it makes it possible to avoid pre-existing electronic bicycle systems, which do not provide for a specific connection for the model identification signal, operating with more recent derailleurs, the command values of which they do not know, in order to avoid damage. The control electronics of pre-existing systems, which is not configured to receive such a model identification signal, receives the constant derailleur model identification signal in the time period between t0 and t2, but it considers it to be a signal of the position, speed, acceleration and/or direction of rotation coming from a faulty Hall sensor 520.

It is worthwhile specifying that in an electronic bicycle system or gearshift, the block diagram of FIG. 5 is implemented by a derailleur unit, for example by the derailleur unit 500 shown in FIG. 6, while the block diagrams of FIGS. 2-4 are implemented by the control electronics 16 of the derailleur, wherever it is made as stated above.

From the description that has been made, the characteristics of the electronic bicycle system object of the present invention are clear, just as the relative advantages are also clear.

Further variants of the embodiments described above are possible, without departing from the teaching of the invention.

In particular, although Hall sensors 518, 520 have been shown as transducers of the position, speed, acceleration and/or direction of rotation of the derailleur 500, other types of sensors can be used, preferably of the analogue type.

The derailleur model recognition signal could be provided, instead of for a time period between t0 and t2 when it is turned on and upon each gearshifting request, just when it is turned on.

Moreover, the derailleur model recognition signal could be provided additionally or just upon request, for example by pressing a particular combination of buttons. In this way the user would have the responsibility of warning the electronic bicycle system that a new derailleur model has been mounted.

The derailleur unit could, vice-versa, make the unique model identification signal continuously available, instead of providing the output on a common output 510 with that of the sensor of the position, speed, acceleration and/or direction of rotation of the derailleur 500.

Finally, it is clear that the described electronic bicycle system can undergo several changes and variants, all of which are encompassed by the invention; moreover, all of the details can be replaced by technically equivalent elements. In practice, the materials used, as well as the sizes, can be whatever according to the technical requirements.

What is claimed is:

1. An electronically servo-assisted bicycle gearshift, comprising a derailleur and control electronics to drive the derailleur in accordance with a table of command values, wherein the derailleur is configured to emit a derailleur model identification signal, and the control electronics is configured to receive the derailleur model identification signal and, if it has an available table of command values suitable for the derailleur model, to use it to drive the derailleur, if not, to prevent actuation of the derailleur.

2. The bicycle gearshift according to claim 1, wherein the derailleur is configured to emit the model identification signal and a signal functional for evaluating at least one of position, speed, acceleration and direction of rotation of the derailleur on a common output.

3. The bicycle gearshift according to claim 2, wherein the derailleur is configured to emit the model identification signal on the common output for a first predetermined time period (t0-t2).

4. The bicycle gearshift according to claim 1, wherein the derailleur is configured to emit the model identification signal on at least one occasion among: when the electronic bicycle gearshift is turned on, upon each gearshifting request, upon request from an operator.

5. The bicycle gearshift according to claim 4, wherein the derailleur is configured to emit the model identification signal when the electronic bicycle gearshift is turned on and upon each gearshifting request.

6. The bicycle gearshift according to claim 1, wherein the control electronics is configured to check, upon each gearshifting request and based on the model identification signal, whether the derailleur has changed and, in an affirmative case, to prevent the actuation of the derailleur.

7. The bicycle gearshift according to claim 3, wherein the control electronics is configured to wait a second predetermined time period (t0-t1) corresponding to an initial part of the first predetermined time period (t0-t2) before checking the model identification signal.

8. The bicycle gearshift according to claim 3, wherein the control electronics is configured to wait a third predetermined time period (t1-t3) corresponding to a final part of the first predetermined time period (t0-t2) and to a subsequent time period (t2-t3) before checking the signal functional for evaluating at least one of position, speed, acceleration and direction of rotation of the derailleur.

9. The bicycle gearshift according to claim 1, wherein the derailleur comprises a voltage reference generator, preferably comprising a buffer and a resistive divider, configured to generate, as said model identification signal, a constant voltage signal.

10. The bicycle gearshift according to claim 9, wherein the control electronics is configured to check in which of a plurality of ranges of predetermined values the constant voltage signal falls and thus discriminate the derailleur model.

11. The bicycle gearshift according to claim 2, wherein the derailleur further comprises a switch, preferably analogue, to switch an output of the derailleur between said model identification signal and said signal functional for evaluating at least one of position, speed, acceleration and direction of rotation of the derailleur.

12. The bicycle gearshift according to claim 2, wherein the control electronics is further configured to check whether the signal functional for evaluating at least one of position, speed, acceleration and direction of rotation of the derailleur is comprised within a predetermined range of values (F1-F2), and in the negative case to prevent the actuation of the derailleur.

13. A component of an electronic bicycle gearshift comprising control electronics to drive a derailleur in accordance with a table of command values, characterised in that wherein the control electronics is configured to receive a derailleur model identification signal and, if it is in possession of a table of command values suitable for the derailleur model, to use it to drive the derailleur, if not, to prevent actuation of the derailleur.

14. A method for actuating an electronically servo-assisted bicycle gearshift, the gearshift comprising a derailleur and control electronics to drive the derailleur in accordance with a table of command values, characterised in comprising the steps of:

emitting a derailleur model identification signal from the derailleur, receiving the derailleur model identification signal in the control electronics, checking in the control electronics whether there is an available table of command values suitable for the derailleur model, and in an affirmative case using it to drive the derailleur, in a negative case preventing the actuation of the derailleur.

15. An electronically servo-assisted bicycle gearshift, comprising a derailleur and control electronics to drive the derailleur in accordance with a table of command values, wherein the derailleur emits a derailleur model identification signal that is received in the control electronics for comparison to the table of command values and, when there is a positive comparison to the derailleur model identification signal, the control electronics will drive the derailleur.

* * * * *